No. 856,358. PATENTED JUNE 11, 1907.
W. J. MORRIS.
MUSIC CHART.
APPLICATION FILED JUNE 8, 1906.
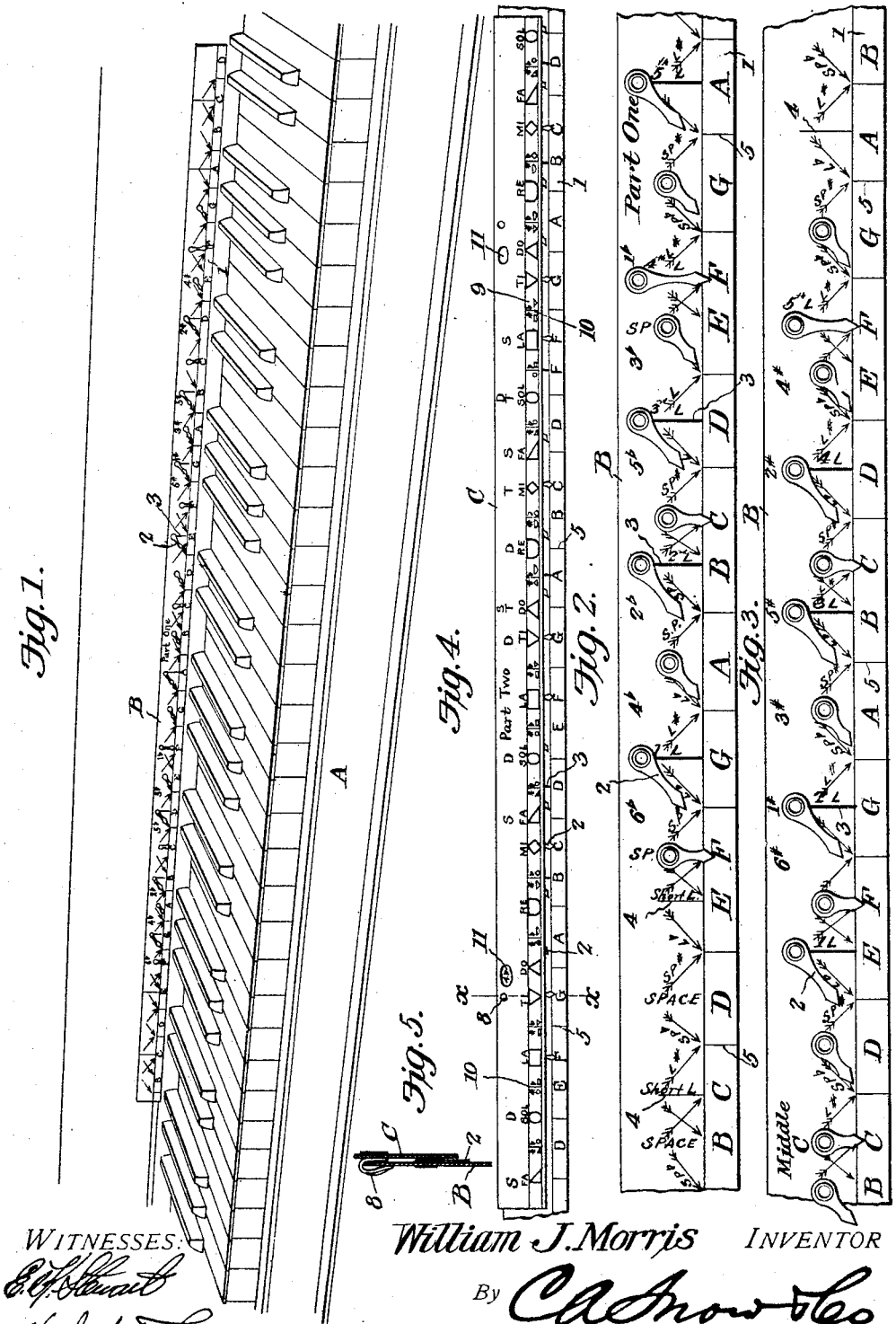
WITNESSES:
William J. Morris INVENTOR
By C. A. Snow & Co
ATTORNEYS

UNITED STATES PATENT OFFICE.

WILLIAM J. MORRIS, OF WAURIKA, OKLAHOMA TERRITORY.

MUSIC-CHART.

No. 856,358.  Specification of Letters Patent.  Patented June 11, 1907.

Application filed June 8, 1906. Serial No. 320,816.

*To all whom it may concern:*

Be it known that I, WILLIAM J. MORRIS, a citizen of the United States, residing at Waurika, in the county of Comanche and Territory of Oklahoma, have invented a new and useful Music-Chart, of which the following is a specification.

This invention relates to music charts for use by beginners in the study of pianoforte playing.

The object of the invention is to provide a simple and inexpensive chart which can be readily applied adjacent the keyboard of an instrument and which has indicators combined therewith for visually designating the keys to be depressed in playing the scale of any given signature.

Another object is to provide a proof attachment whereby the accuracy of the positions of the indexes can be readily determined.

A still further object is to provide a music chart by the use of which a beginner can quickly learn to properly locate various degrees of the staff upon the keyboard.

With the above and other objects in view the invention consists of a chart made up of a series of spaces disposed longitudinally thereon and equal in width to the distances between the black keys of the keyboard so that when the chart is in position back of the keys the dividing lines between the spaces will be disposed directly above the black keys. These spaces contain the note-designating letters and arranged above each letter is an index or pointer which is pivotally mounted so as to be conveniently shifted in order to indicate either the white key thereunder or either of the adjoining black keys. Heavy lines are placed above those letters on the chart which indicate the notes on the lines of the staff, those lines extending below the bass staff and above the treble staff being lighter than the remaining lines so that the notes can be readily located by the student. Inclined arrows are designated upon the staff and extend from the pivots of the indexes to the adjoining division lines of the spaces, those arrows extending to the left of the indexes being used to designate the positions to be assumed by the indexes in indicating flats and those extending to the right being employed for a similar purpose in designating sharps. A proof chart is provided for use in connection with the indicator chart and is similarly divided into spaces containing syllables of the major diatonic scale so that by properly placing these syllables above the index scale the positions to be assumed by the indexes in order to indicate the location of the notes in any desired key can be readily determined.

The invention also consists of certain other novel features of construction and combinations of parts which will be hereinafter more fully described and pointed out in the claims.

In the accompanying drawings is shown the preferred form of the invention.

In said drawings: Figure 1 is a perspective view of a portion of a keyboard having the indicating chart in position thereon; Fig. 2 is an enlarged view of one half of the indicating chart adjusted to indicate the key of D flat; Fig. 3 is a similar view of the other half thereof; Fig. 4 is a view of the proof chart the same being shown in position upon the indicating chart; and Fig. 5 is a section on line $x$—$x$ Fig. 4.

Referring to the figures by characters of reference, A is the keyboard of an instrument above the rear portion of which is secured an indicating chart B which may be fastened into position in any preferred manner. As shown particularly in Figs. 2 and 3 this chart has a column of spaces 1 arranged along the lower edge thereof said spaces being equal in width to the distances between the black keys and containing indicating letters of the keys above which the spaces are located. Middle C of the staff is preferably located adjacent the center of the chart. A pointer or index 2 is pivotally connected to the chart above each of the note indicating letters and these pointers when in their normal positions, as when indicating the key of C, point directly to the letters within the spaces. Heavy lines 3 appear upon the chart above the letters of those notes occurring upon the lines of the staff while the word "space" or an abbreviation thereof such as "sp" is printed or otherwise indicated on the chart above those letters indicating the notes to be found in the spaces of the staff. Those notes appearing on small lines above or below the staff have short lines 4 extending upward from their indicating letters on the chart, said lines being preferably associated with the words "short line" or an abbreviation thereof. The division lines 5 between the spaces 1 indicate the position of the flat or sharp of a note and arrows 6 and 7 extend in opposite directions from each pointer 2 to the adjoining division lines 5. Those arrows extending to the left of the pointers of the spaces are indicated by the word "space" or an abbreviation thereof and a flat indicating character while those extending to the right thereof are indicated by the word "space" or an abbreviation thereof and the sharp indicating character. The arrows extending from the pointers of the lines 3 are similarly indicated with the exception that the word "line" or an abbreviation thereof is substituted for the word "space." As the signature of the key of G flat is six flats said signature is disposed above the division line 5 at the left of the letter G below middle C and for the same reason the signature of four flats is arranged above the division line to the left of letter A; two flats above the division line to the left of the letter B; five flats above the division line to the left of the letter D; three flats above the division line to the left of letter E; and one flat above the letter F. The key notes of the sharps are indicated at the right of middle C by the signatures of the various keys which are properly placed above the letters designating the key notes. By reference to the chart it will be noted that the signature of six sharps is disposed above the division line of F and G; one sharp is disposed above the letter G; three sharps above the letter A; five sharps above the letter B; two sharps above the letter D; and four sharps above the letter E.

With the parts indicated and arranged in the manner herein described the notes of the scale of any desired key can be readily determined. For instance, if the location of the notes of the scale in the key of D flat is to be determined the D indicating pointer is swung to the left to indicate D flat and the pointers of the letters E, G, A, and B are swung to the left to indicate the division lines to the left thereof. The keys of the keyboard indicated by these pointers are the ones to be depressed in playing the scale. The scales in various other keys can be determined with equal facility.

In order that the adjustment of the pointers may be proven correct or incorrect and to enable beginners who are not fully acquainted with the location of the tones and semi-tones, to properly position the notes of the scale a proof chart C is provided such as shown in Figs. 4. This chart C has hooks 8 at its upper edge for engaging the corresponding edge of the indicating chart B. A column of spaces 9 is arranged along the lower edge of the proof chart and these spaces correspond with the spaces 1 of the indicating chart. Instead of said spaces being indicated by the letters of the notes they are indicated by the syllable of the notes so that when the two charts are positioned to indicate the key of C the syllables "do" and "re" will be disposed above the letters C and D of the indicating chart and the other syllables are correspondingly properly positioned. Characters such as employed for graphically designating the various notes may be associated upon the proof chart with the note syllables, and the division lines 10 between the spaces 9 have sharp and flat characters located to the left and right thereof respectively so as to indicate the direction of a tone in sharping or flatting any note. Openings 11 are formed within the proof chart above the syllable "do" and obviously whenever this syllable is placed above any of the sharps or flats the signature of the key thus indicated will appear in the opening as shown in Fig. 4. In said figure it will be noted that the signature of four flats appears within the opening and that the syllable "do" is disposed above the division line to the left of letter A. The pointer 2 extends in the direction of said line and the other pointers indicate that within the scale of A flat the notes B, D, and E as well as A are flatted. Moreover said pointers also indicate which keys of the keyboard are to be depressed in playing the scales. It will be noted that the syllables "do," "mi" and "sol" are further indicated by the letter T and that the syllable "do," "fa" and "la" are further indicated by the letter S and that the syllables "ti," "re" and "sol" are further indicated by the letter D. These letters are employed to indicate the tones of the various chords the letters T indicating the notes to be played when the tonic harmony predominates; the S's when subdominant and the D's when dominant.

The charts herein described are very simple, and by their use a beginner in the study of piano or other playing can quickly learn to properly locate the chords of various keys and can easily distinguish upon a keyboard the notes indicated upon a staff.

The preferred form of the invention has been set forth in the foregoing description but I do not limit myself thereto as I am aware that modifications may be made therein without departing from the spirit or sacrificing the advantages thereof, and I therefore reserve the right to make such changes as fairly fall within the scope of the claims.

What is claimed is:

1. A chart comprising a strip having a column of spaces along one edge adapted to register with the spaces between the black keys of a keyboard, said spaces containing note indicating letters, and a pointer pivotally mounted adjacent each letter, any one of said pointers adapted to be adjusted to either side of its letter to indicate the sharp or flat of said letter.

2. A chart comprising a strip having a column of spaces thereon adapted to register with the spaces between the black keys of a keyboard, each space containing a letter or letters indicating notes of the scale, the division lines between the spaces being disposed above the black keys when the strip is in position and designating the sharps or flats of the letters, certain of said letters having arranged adjacent thereto the signatures of the keys in which said letters designate the key notes, and pointers movably mounted adjacent, and normally indicating the letters, said pointers adapted to be adjusted in the direction of the adjoining division lines.

3. A chart comprising a strip having a column of spaces thereon adapted to register with the spaces between the black keys of a keyboard, each space containing a letter or letters indicating notes of the scale, the division lines between the spaces being disposed above the black keys when the strip is in position and designating the sharps or flats of the letters, certain of said letters having arranged adjacent thereto the signatures of the keys in which said letters designate the key notes, pointers movably mounted adjacent, and normally indicating the letters, said pointers adapted to be adjusted in the direction of the adjoining division lines, and a proof chart comprising a strip having a column of spaces thereon corresponding with the spaces in the first mentioned chart, said spaces being indicated by the syllables of the diatonic scale.

4. A chart comprising a strip having a column of spaces thereon adapted to register with the spaces between the black keys of a keyboard; each space containing a letter or letters indicating notes of the scale, the division lines between the spaces being disposed above the black keys when the strip is in position and designating the sharps or flats of the letters, certain of said letters having arranged adjacent thereto the signatures of the keys in which said letters designate the key notes, pointers movably mounted adjacent, and normally indicating the letters, said pointers adapted to be adjusted in the direction of the adjoining division lines, and a proof chart adjustably mounted upon the first mentioned chart and having a column of spaces corresponding with the spaces of the first mentioned chart, said spaces being designated by the syllables of the diatonic scale, said proof chart having openings adapted to register with the signature, on the first mentioned chart, of the key to which the chart is adjusted.

5. A chart comprising a strip having a column of spaces thereon adapted to register with the spaces between the black keys of a keyboard, each space containing a letter or letters indicating notes of the scale, the division lines between the spaces being disposed above the black keys when the strip is in position and designating the sharps or flats of the letters, certain of said letters having arranged adjacent thereto the signatures of the keys in which said letters designate the key notes, pointers movably mounted adjacent, and normally indicating the letters, said pointers adapted to be adjusted in the direction of the adjoining division lines, a proof strip having a column of spaces indicated thereon and similar to the spaces on the first mentioned chart, said spaces being designated by the syllables of the diatonic scale, and certain of said spaces being designated by characters for indicating the notes to be played when the dominant, subdominant or tonic harmony predominates, and means upon the proof strip for slidably engaging the chart.

6. A chart comprising a strip having a column of spaces thereon adapted to register with the spaces between the black keys of a keyboard, each space containing a letter or letters indicating notes of the scale, the division lines between the spaces being disposed above the black keys when the strip is in position and designating the sharps or flats of the letters, certain of said letters having arranged adjacent thereto the signatures of the keys in which said letters designate the key notes, pointers movably mounted adjacent, and normally indicating the letters, said pointers adapted to be adjusted in the direction of the adjoining division lines, a proof strip having a column of spaces indicated thereon and similar to the spaces on the first mentioned chart, said spaces being designated by the syllables of the diatonic scale, and certain of said spaces being designated by characters for indicating the notes to be played when the dominant, subdominant or tonic harmony predominates, means upon the proof strip for slidably engaging the chart, said proof strip having openings adapted to register with the signatures of the key designated by the chart.

7. A music chart comprising a strip having a column of spaces along one edge adapted to register with the spaces between the black keys of a keyboard, said spaces containing note indicating characters, said strip being also provided with a plurality of lines and spaces for indicating the relative positions of the notes upon the staff, and pointers movably mounted adjacent the letters and adapted to be swung to either side thereof to indicate the sharps and flats.

8. The combination with a strip having a plurality of key indicating spaces thereon and key designating letters within the spaces; the division lines between said spaces indicating the sharps or flats of the designated keys, and pointers movably mounted adjacent the letters for designating said letters or the adjoining division lines; of a proof strip having a series of spaces thereon corresponding with the spaces on the first mentioned strip, said spaces being designated by the syllables of the diatonic scale, and means upon the proof strip for slidably engaging the first mentioned strip.

9. The combination with a strip having a plurality of key indicating spaces thereon and key designating letters within the spaces, the division lines between said spaces indicating the sharps or flats of the designated keys, and pointers movably mounted adjacent the letters for designating said letters or the adjoining division lines, said strip having indicated thereon adjacent some of the letters the signatures of the keys in which said letters indicate the key notes; of a proof strip having a series of spaces thereon corresponding with the spaces on the first mentioned strip, said spaces being designated by the syllables of the diatonic scale, and means upon the proof strip for slidably engaging the first mentioned strip.

10. The combination with a strip having a plurality of key indicating spaces thereon and key designating letters within the spaces, the division lines between said spaces indicating the sharps or flats of the designated keys, and pointers movably mounted adjacent the letters for designating said letters or the adjoining division lines, said strip having indicated thereon adjacent some of the letters the signatures of the keys in which said letters indicate the key notes; of a proof strip having spaces thereon corresponding with the spaces on the first mentioned strip, said spaces being designated by the syllables of the diatonic scale, and means upon the proof strip for slidably engaging the first mentioned strip, said strip having openings therein adapted to register with the signature of the key indicated by the proof strip.

In testimony that I claim the foregoing as my own, I have hereto affixed my signature in the presence of two witnesses.

WILLIAM J. MORRIS.

Witnesses:
WILLIAM F. HARRIS,
E. L. DABBS.